(12) United States Patent
Forsyth

(10) Patent No.: US 10,197,010 B2
(45) Date of Patent: Feb. 5, 2019

(54) LONG-DUCT, MIXED-FLOW NOZZLE SYSTEM FOR A TURBOFAN ENGINE

(71) Applicant: The Boeing Company, Chicago, IL (US)

(72) Inventor: David William Forsyth, Maple Valley, WA (US)

(73) Assignee: The Boeing Company, Chicago, IL (US)

( * ) Notice: Subject to any disclaimer, the term of this patent is extended or adjusted under 35 U.S.C. 154(b) by 1035 days.

(21) Appl. No.: 13/964,706

(22) Filed: Aug. 12, 2013

(65) Prior Publication Data

US 2015/0044030 A1    Feb. 12, 2015

(51) Int. Cl.
*F02K 1/46*    (2006.01)
*F02K 1/38*    (2006.01)

(52) U.S. Cl.
CPC ............... *F02K 1/46* (2013.01); *F02K 1/386* (2013.01); *Y10T 29/49229* (2015.01)

(58) Field of Classification Search
CPC ... F02K 1/46; F02K 1/48; F02K 1/386; Y10T 29/49229
See application file for complete search history.

(56) References Cited

U.S. PATENT DOCUMENTS

| | | | | |
|---|---|---|---|---|
| 2,968,150 A * | 1/1961 | Goebel | ............... | F02K 1/48 181/215 |
| 3,262,264 A * | 7/1966 | O'Neill | ............... | F02K 1/386 239/127.3 |
| 4,066,214 A * | 1/1978 | Johnson | ............... | F02K 1/386 239/265.19 |
| 4,288,984 A * | 9/1981 | Bhat | ............... | F02K 1/44 60/226.1 |
| 4,566,270 A * | 1/1986 | Ballard | ............... | F02K 1/825 60/264 |
| 4,592,201 A | 6/1986 | Dusa et al. | | |
| 4,813,230 A * | 3/1989 | Braithwaite | ............... | F02K 1/386 181/220 |
| 5,167,118 A * | 12/1992 | Torkelson | ............... | F02K 1/827 181/213 |
| 5,265,807 A * | 11/1993 | Steckbeck | ............... | F02K 1/48 181/213 |

(Continued)

FOREIGN PATENT DOCUMENTS

| | | |
|---|---|---|
| EP | 0761947 | 5/2000 |
| EP | 0761956 | 11/2002 |

(Continued)

*Primary Examiner* — Ted Kim
(74) *Attorney, Agent, or Firm* — Vivacqua Law

(57) ABSTRACT

A long-duct mixed-flow nozzle system for a turbofan engine, the nozzle system may include an inner housing configured to enclose a core and form a core flow duct, the inner housing terminating in a core nozzle having a core exit aperture, an outer housing forming a fan flow duct and terminating in a fan exit aperture at a location downstream of the core exit aperture, the fan exit aperture having a plurality of chevrons, and the core exit aperture having a plurality of chutes separated by radially extending lobes configured to mix exhaust gas from the core flow duct with bypass gas flow in the fan flow duct, the radially extending lobes varying in profile from each other.

21 Claims, 3 Drawing Sheets

(56) References Cited

U.S. PATENT DOCUMENTS

| | | | |
|---|---|---|---|
| 6,360,528 B1 * | 3/2002 | Brausch | F02K 1/46 |
| | | | 181/220 |
| 6,578,355 B1 * | 6/2003 | Mundt | F02K 1/386 |
| | | | 181/220 |
| 7,762,057 B2 | 7/2010 | Sloan et al. | |
| 7,836,700 B2 | 11/2010 | Viswanathan | |
| 8,157,207 B2 | 4/2012 | Mengle et al. | |
| 8,341,935 B2 | 1/2013 | Marques et al. | |
| 8,776,527 B1 * | 7/2014 | Sokhey | F02K 1/825 |
| | | | 60/770 |
| 2002/0073690 A1 * | 6/2002 | Tse | F02K 1/46 |
| | | | 60/204 |
| 2005/0193716 A1 * | 9/2005 | Schlinker | F02K 1/386 |
| | | | 60/226.1 |
| 2008/0190096 A1 * | 8/2008 | Lord | F02K 1/386 |
| | | | 60/262 |
| 2010/0257865 A1 * | 10/2010 | Mengle | F02K 1/48 |
| | | | 60/770 |
| 2011/0155862 A1 | 6/2011 | Mengle | |
| 2012/0023961 A1 | 2/2012 | Kupratis | |

FOREIGN PATENT DOCUMENTS

| | | |
|---|---|---|
| EP | 0913567 | 11/2003 |
| EP | 1451461 | 4/2007 |
| EP | 1485600 | 11/2009 |
| EP | 1731747 | 8/2010 |
| EP | 2327869 | 6/2011 |
| EP | 2153049 | 12/2011 |

* cited by examiner

LONG-DUCT, MIXED-FLOW NOZZLE SYSTEM FOR A TURBOFAN ENGINE

FIELD

The disclosure relates to turbofan engines and, more particularly, to turbofan engines having long-duct, mixed-flow nozzles.

BACKGROUND

A turbofan engine is characterized by a fan that is mounted on a shaft that is turned by a gas turbine. The fan provides thrust, as does the exhaust of the gas turbine. The gas turbine is positioned downstream of the fan, and may include, in order, a low-pressure compressor, a high-pressure compressor, a combustion chamber, a high-pressure turbine, a low-pressure turbine, and an exhaust or core nozzle terminating in a core exit aperture. These components may be enclosed in an inner housing forming a core of the turbofan engine. The fan may be turned by a low-pressure shaft driven by the low-pressure turbine. The high-pressure turbine may be connected to, and thereby rotate, the high-pressure compressor by a high-pressure shaft. The fan is enclosed in an outer housing forming a fan flow duct for directing the thrust produced by the fan and a faired nacelle for directing the free stream around the whole installation. The fan flow duct terminates in a fan nozzle having a fan exit aperture.

There are at least two types of turbofan engine nacelles. A first type includes a fan nozzle in which the fan exit aperture is upstream of the core exit aperture. In order to reduce the noise produced by a turbofan engine of such design, the fan exit aperture may be fitted with generally triangularly shaped "chevrons" that are shaped to extend from the outer surface of the nacelle into the bypass gas flow from the fan exit aperture to create vorticity and thereby increase the amount of mixing between the high velocity air exiting the fan exit aperture and the surrounding free stream air. Increased noise reduction may be accomplished by varying the configuration of the chevrons azimuthally about the circumference of the fan nozzle.

A second type of turbofan engine includes a long-duct, mixed-flow nozzle. In such an engine, the nacelle is extended so that the fan exit aperture is located downstream of the core exit aperture, and is configured to mix a relatively cool bypass gas flow from the fan with the hot gas flow from the core before the gases are exhausted from the turbofan engine. With such a long-duct, mixed-flow nozzle, the inner housing enclosing the core may include a mixer positioned at the core exit aperture. The mixer may include lobes separated by chutes that cooperate to channel gas flow from the bypass duct, defined by the outer housing, with the relatively hot gases of the core exit nozzle from the gas turbine. With such mixed-flow design, the configuration of the lobes and chutes are typically identical, that is, they are radially symmetrical about the central axis of the turbofan engine. Such long-duct, mixed-flow turbofan engines possess increased fuel economy at the expense of weight as compared to the first type of turbofan engine.

As a result of market demand for increasing range and fuel economy, a turbofan engine with a long-duct, mixed-flow nacelle could be used to improve the fuel economy of some turbofan engines without increasing noise, while maintaining the same bypass ratio.

SUMMARY

In one aspect, a long-duct, mixed-flow nozzle system for a turbofan engine may include an inner housing configured to enclose a core and form a core flow duct, the inner housing terminating in a core nozzle having a core exit aperture, an outer housing forming a fan flow duct and terminating in a fan exit aperture at a location downstream of the core exit aperture, the fan exit aperture having a plurality of chevrons, and the core exit aperture having a plurality of chutes separated by radially extending lobes configured to mix exhaust gas from the core flow duct with bypass gas flow in the fan flow duct, the radially extending lobes varying in profile from each other.

In another aspect, a vehicle may include a turbofan engine having a long-duct, mixed-flow nozzle may include a fan, a core having a low-pressure compressor, a high-pressure compressor, a combustion chamber, a high-pressure turbine and a low-pressure turbine connected to drive the fan, a core housing enclosing the core and forming a core flow duct configured to direct exhaust from the core aft of the turbofan engine, the core housing having an inlet downstream of the fan, and an outlet terminating in a core nozzle having a core exit aperture, an outer housing an inlet enclosing the fan and forming a fan flow duct with the core housing configured to direct air flow from the fan aft of the turbofan engine, the outer housing terminating in a fan exit aperture downstream of the core exit aperture, the fan exit aperture shaped to have a plurality of chevrons, and the core exit aperture shaped to form a plurality of chutes separated by radially extending lobes, the radially extending lobes varying in profile from each other about the core nozzle periphery and configured to mix exhaust from the core flow duct with exhaust from the fan flow duct.

In yet another aspect, a method of constructing a long-duct, mixed-flow nozzle for a turbofan engine may include forming an inner housing configured to enclose a core and form a core flow duct, the inner housing terminating in a core nozzle having a core exit aperture, forming an outer housing defining a fan flow duct and terminating in a fan exit aperture at a location downstream of the core exit aperture, the fan exit aperture having a plurality of chevrons, and providing the core exit aperture with a plurality of chutes separated by radially extending lobes shaped to mix bypass gas flow from the fan flow duct with exhaust from the core exit aperture, the radially extending lobes varying in profile.

Other aspects and advantages of the disclosed long-duct, mixed-flow nozzle system for a turbofan engine will be apparent from the following description, the accompanying drawings and the appended claims.

DETAILED DESCRIPTION

Figure 1:
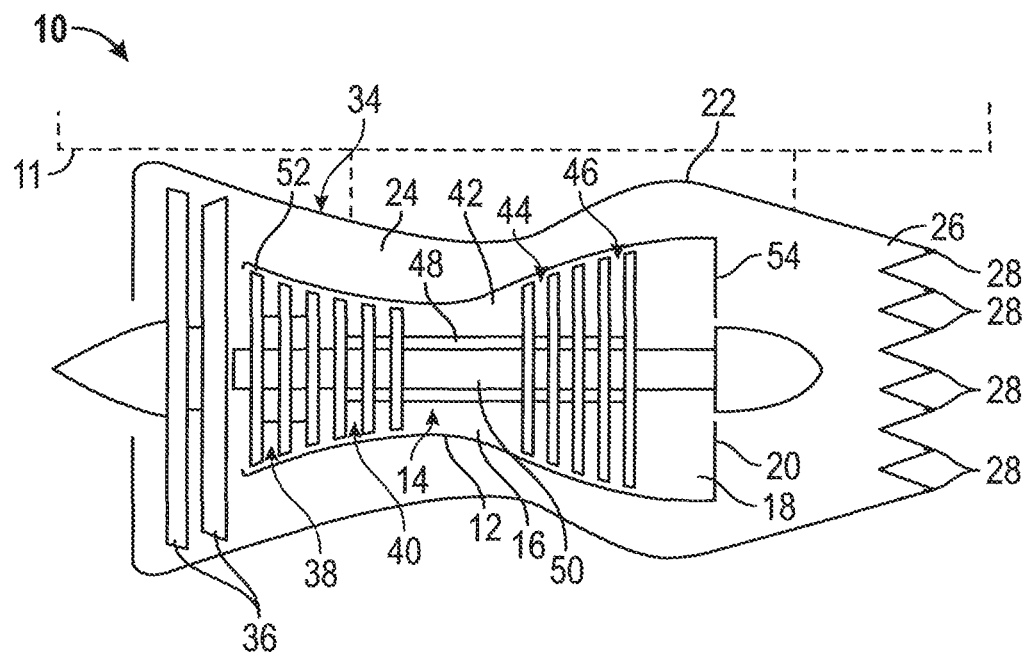
FIG. 1 is a schematic, side elevation of an embodiment of the disclosed long-duct, mixed-flow nozzle system for a turbofan engine, shown mounted on a vehicle.

As shown in FIG. 1, an embodiment of the disclosed long-duct, mixed-flow nozzle system for a turbofan engine, generally designated 10, may be mounted on a vehicle 11. In embodiments, the vehicle 11 may comprise an aircraft, such as a jet aircraft or helicopter, a marine vessel, such as a hovercraft, or a land vehicle. The nozzle system 10 may include an inner housing 12 configured to enclose a core, generally designated 14, and form a core flow duct 16, the inner housing terminating in a core nozzle 18 having a core exit aperture 20. The system 10 also may include an outer housing, which in the embodiment of FIG. 1 may be a nacelle, generally designated 22, forming a fan flow duct 24 with the inner housing 12 and terminating in a fan exit aperture 26 at a location downstream of the core exit aperture 20. The fan exit aperture 26 may include a plurality of chevrons 28 that may be spaced about a periphery of the fan exit aperture.

Figure 2:
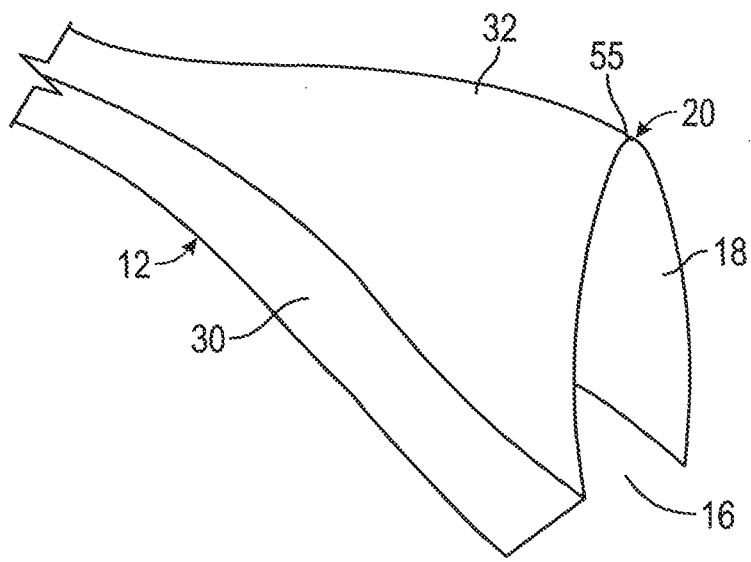
FIG. 2 is a schematic detail of a lobe and chute of the nozzle system of FIG. 1.

As shown in FIGS. 1 and 2, the core exit aperture 20 may be shaped to form a plurality of chutes 30 that may be separated by radially extending lobes 32. The radially extending lobes 32 may extend into the fan flow duct 24 and may be configured to mix exhaust gas from the core flow duct 16 with bypass gas flow from the fan flow duct 24. As will be discussed in greater detail, in embodiments, the radially extending lobes 32 may vary in profile from each other and extend about a periphery of the core exit aperture 20.

The long-duct, mixed-flow nozzle system 10 may be incorporated into a turbofan engine, generally designated 34. In an embodiment, the turbofan engine may include a fan, generally designated 36, located within the outer housing 22 upstream of the core 14 and inner housing 12. Downstream of the fan 36 the inner housing 12 may enclose, in order, a low-pressure compressor 38 located within the core 14, a high-pressure compressor 40, also located within the core, a combustion chamber 42 located within the core and downstream of the high-pressure compressor, a high-pressure turbine 44, located downstream of the combustion chamber, and a low-pressure turbine 46 located downstream of the high-pressure turbine. The high-pressure compressor 40 and high-pressure turbine 44 may be mounted on a common high-pressure shaft 48 that is rotatably mounted within the core 14. The fan 36, low-pressure compressor 38, and low-pressure turbine 46 may be mounted on a low-pressure shaft 50.

In the embodiment shown in FIG. 1, the core 14, defined by the inner housing 12, may include an inlet 52 located downstream of the fan 36, and an outlet 54 that may terminate in the core nozzle 18 having a core exit aperture 20. The outer housing 22 may be configured to enclose the fan 36 and form the fan flow duct 24 with the inner housing or core housing 12. The fan flow duct 24 may be configured to direct air flow from the fan 36 aft of the turbofan engine. The outer housing 22 may terminate in the fan exit aperture 26 that may be shaped to form a plurality of fan exit chevrons 28.

Accordingly, the nozzle system 10 may include a fan flow duct 24 that may be configured to convey a relatively cool bypass gas flow from the fan 36, and a core flow duct 16 configured to convey a relatively hot gas flow from the combustion chamber 42 of the core 14. In such an embodiment, the radially extending lobes 32 may be configured to mix the relatively cool bypass gas flow with the relatively hot gas flow from the core flow duct 16. Such mixing of the relatively cool bypass gas flow with the relatively hot gas flow may result in increased thrust generated by the turbofan engine 34.

Figure 3:
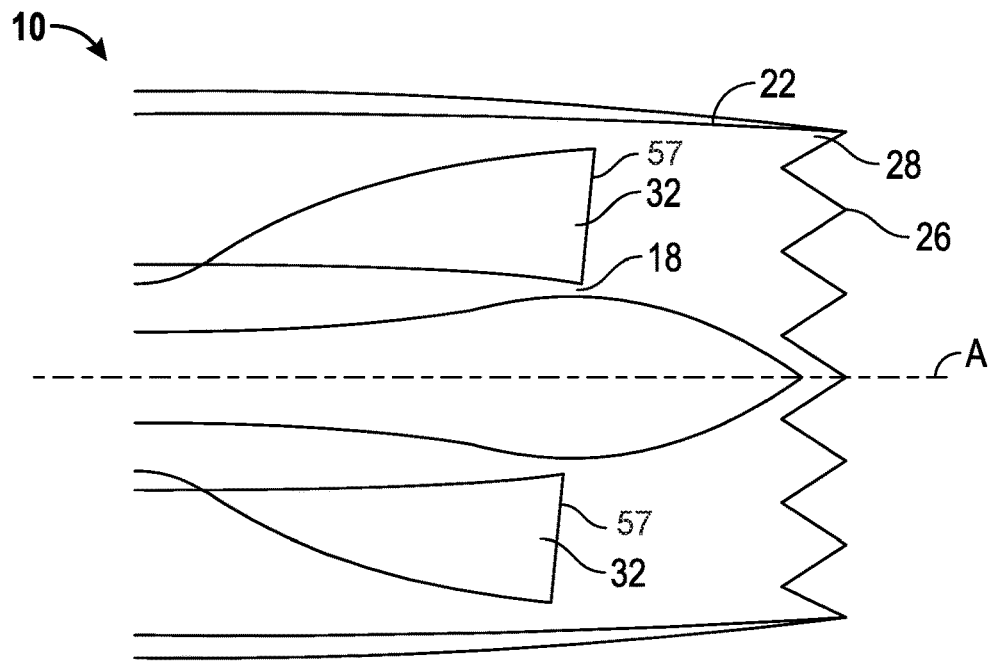
FIG. 3 is a schematic detail of another embodiment of the disclosed long-duct, mixed-flow nozzle system, showing azimuthal variation of exit plane shape.

As shown in FIGS. 3, 4, 5, and 6, the plurality of radially extending lobes 32 may vary in profile from each other in a selected one or more of spacing, shape, width, exit plane shape, and radial length about the periphery of the core nozzle 18. In the embodiment of FIG. 3, the radially extending lobes 32 may be varied in exit plane shape. That is, the angles the trailing edges 57 of the lobes 32 make with a central axis A of the nozzle system 10 may vary about the periphery of the core exit aperture 20.

Figure 4:
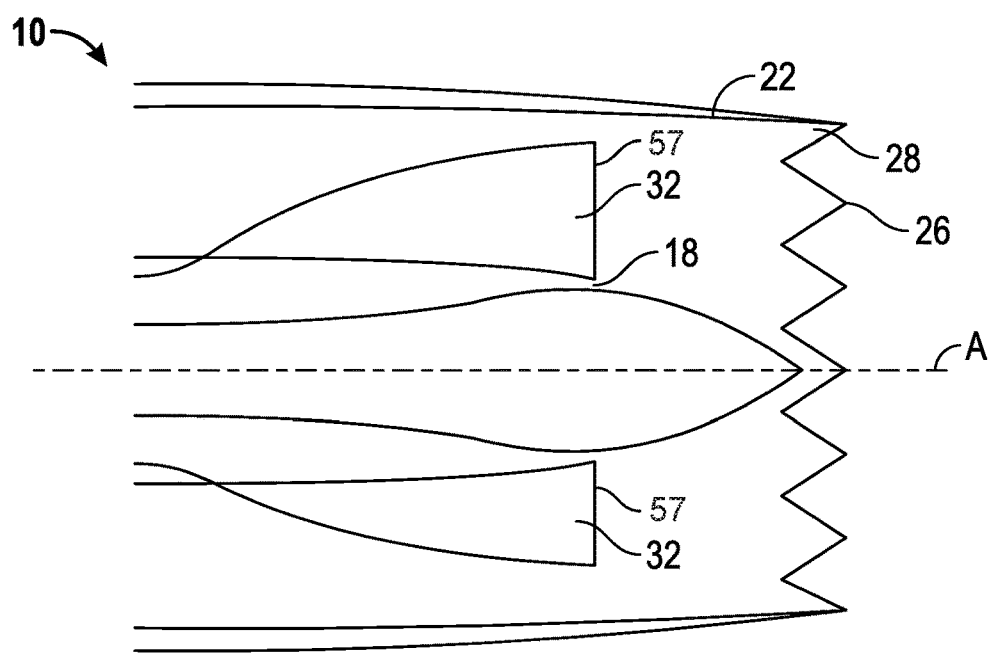
FIG. 4 is yet another embodiment of the disclosed long-duct, mixed-flow nozzle system, showing azimuthal variation of mixer chute profile.

As shown in FIG. 4, the profiles of the lobes 32 may vary azimuthally about the periphery of the core exit aperture 20. That is, the radial height of the trailing edges 57 of the lobes 32 may vary, as measured from the central axis A of the system 10.

Figure 5:
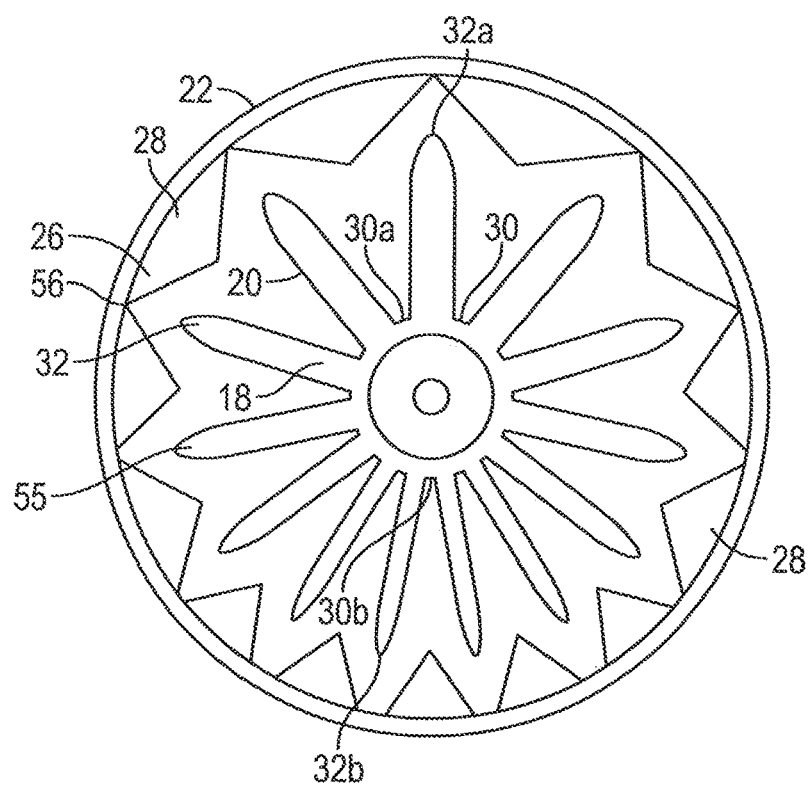
FIG. 5 is as schematic end elevation of still another embodiment of the disclosed long-duct, mixed-flow nozzle system, showing azimuthal variation of mixer chute spacing.

As shown in FIG. 5, the lobes 32 may be configured to vary in spacing about the periphery of the core exit aperture 20. For example, lobe 32a at the 12 o'clock position of the core exit aperture 20 (as shown in FIG. 5) may be wider, measured in a circumferential dimension, than lobe 32b, located at approximately the 6 o'clock position in FIG. 5. Further, the widths of the lobes 32 may gradually decrease in size from lobe 32a to lobe 32b, so that the widths of the lobes vary about the periphery of the core exit aperture 20. Conversely, the chutes 30 between the lobes 32 may vary in spacing about the periphery of the outer housing 22. For example, chute 30a and chutes adjacent to lobe 32a may be spaced farther apart than the chutes in the region of lobe 32b, such as, for example, chute 30b.

Figure 6:
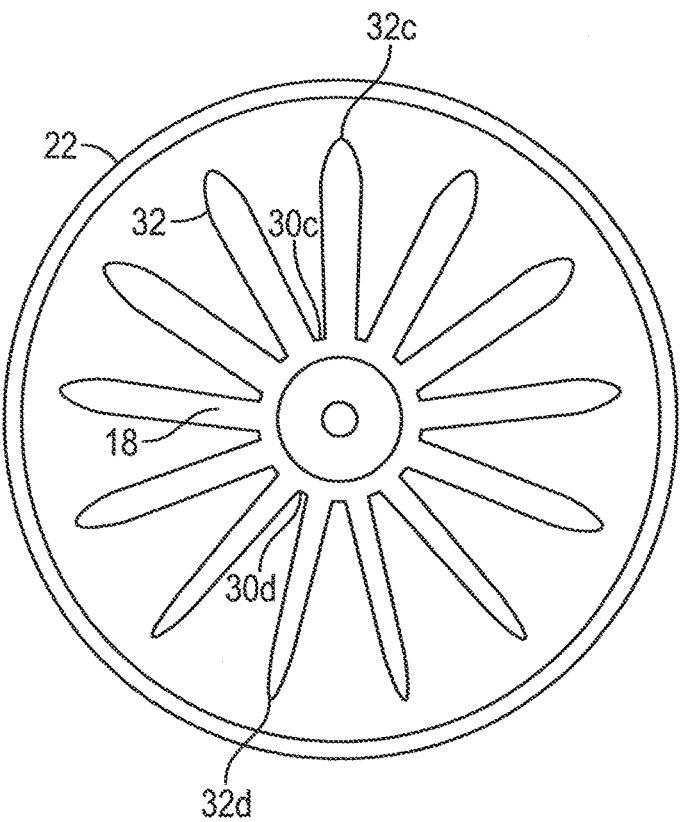
FIG. 6 is a schematic end elevation of still another embodiment of the disclosed long-duct, mixed-flow nozzle system, showing azimuthal variation of mixer chute width.

In FIG. 6, the lobes 32 may be configured such that the widths of the chutes 30 (see FIG. 2) vary about the periphery of the outer housing 22. For example, the width of chute 30c that is adjacent a relatively wide lobe 32c may be relatively small in a circumferential direction, compared to the width of the chute 30d that is adjacent the relatively narrow lobe 32d. Accordingly, in the embodiment of FIG. 6, the widths of the chutes 30 may increase as they progress about the periphery of the core exit aperture 20 from the relatively wide lobe 32c to the relatively narrow lobe 32d.

As shown in FIGS. 3, 4, and 5, in embodiments, the fan exit chevrons 28 may vary in shape about a periphery of the fan exit aperture 26, selected from one or more of varying in a length, varying in a width, and varying in spacing between adjacent ones of the fan exit chevrons. In an embodiment, the radially extending lobes 32, which may vary in shape and/or spacing about the periphery of the core exit aperture 20, may be matched with the fan exit chevrons 28 to provide optimal sound reduction and operational efficiency. In embodiments, the radially extending lobes 32 may be matched with the fan exit chevrons 28 selected from one or more of a spacing of the radially extending lobes about a periphery of the core exit aperture 20 and a spacing of the fan exit chevrons about a periphery of the fan exit aperture 26, and a shape of the radially extending lobes and a shape of the fan exit chevrons.

In embodiments, the matching may take the form of circumferentially aligning the fan exit chevrons 28 about the periphery of the fan exit aperture 26 with radially extending lobes 32 about the core exit aperture 20 so that the chevrons and lobes correspond in relative size, length, width, spacing, and other physical characteristics, so that the matching may result in progressively larger and/or longer lobes matched with progressively larger and/or longer chevrons about the fan exit aperture and core exit aperture, respectively. In other embodiments, the matching may take the form of circumferentially aligning relatively large or long radially extending lobes 32 with relatively small or short fan exit chevrons 28, so that the matching may result in progressively larger and/or longer lobes matched with progressively smaller and/or shorter chevrons about the fan exit aperture and core exit aperture, respectively.

In a particular embodiment, as shown in FIG. 5, the lobe count (i.e., the number of radially extending lobes 32 spaced about the periphery of the core exit aperture 20), may be selected to equal the chevron count (i.e., the number of fan exit chevrons 26 spaced about the periphery of the fan exit aperture 26). In a particular embodiment, as shown in FIG. 5, the tips 55 of the radially extending lobes 32 may be circumferentially positioned to line up radially with the spaces 56 between the chevrons 28 spaced about the periphery of the fan aperture exit 26. Such a matching of spacing between radially extending lobes 32 and chevrons 28 may diminish or prevent the contact of hot gas exiting the radially extending lobes 32 from contacting the chevrons 28.

A method of constructing a long-duct, mixed-flow nozzle system 10 for a turbofan engine 34 may include forming an inner housing 12 configured to enclose a core 14 and form a core flow duct 16, the inner housing terminating in a core nozzle 18 having a core exit aperture 20. An outer housing 22 may be formed that defines a fan flow duct 24 and terminates in a fan exit aperture 26 at a location downstream of the core exit aperture 20. The fan exit aperture 26 may include a plurality of chevrons 28 and the core exit aperture 20 may be provided with a plurality of chutes 30 separated by radially extending lobes 32 shaped to mix bypass gas flow from the fan flow duct 24 with exhaust gases from the core exit aperture 20, and varying the lobes in profile. The core nozzle 18 may be provided with a plurality of radially extending lobes 32 that may include spacing the lobes about a periphery of the core exit aperture such that the lobes may vary in profile from each other and a selected one or more of a spacing between the lobes, a shape of the lobes, a width of the lobes, an exit plane shape of the lobes, and a radial length of the lobes.

The outer housing 22 may be formed with fan exit chevrons 28 that are spaced about the periphery of the fan exit aperture 26 such that the fan exit chevrons vary in a shape about the periphery of the fan exit aperture. In an embodiment, varying the shape of the fan exit chevrons 28 may be selected from one or more of varying a length of the fan exit chevrons, varying a width of the fan exit chevrons and varying a spacing of the fan exit chevrons about the fan exit aperture 26. In yet another embodiment, the radially extending lobes 32 may be matched with the fan exit chevrons 28 such that the resultant combination provides optimal sound reduction and operational efficiency. In still another embodiment, this matching may include matching the radially extending lobes 32 with the fan exit chevrons 28 by selecting one or more of a spacing of the radially extending lobes about a periphery of the core exit aperture 20 and a spacing of this fan exit chevrons about the fan exit, and a shape of the radially extending lobes and a shape of the fan exit chevrons. Further, the spacing of the fax exit chevrons 28 and radially extending lobes 32 may be selected such that the tips 55 of the radially extending lobes are radially aligned with spaces 56 between the fan exit chevrons 28. Still further, the number of the radially extending lobes 32 may be selected to equal the number of the fan exit chevrons 28.

While the methods and forms of apparatus herein described constitute preferred embodiments of the long-duct, mixed-flow nozzle system for a turbofan engine, it is to be understood that the invention is not limited to these precise forms of apparatus and methods, and that changes may be made therein without departing from the scope of the invention.

What is claimed is:

1. A long-duct, mixed-flow nozzle system for a turbofan engine, the nozzle system comprising:
   an inner housing configured to enclose a core and form a core flow duct, the inner housing terminating in a core nozzle having a core exit aperture;
   an outer housing forming a fan flow duct and terminating in a fan exit aperture at a location downstream of the core exit aperture, the fan exit aperture defining a periphery and having a plurality of fan exit chevrons spaced around the periphery of the fan exit aperture; and
   the core exit aperture having a plurality of chutes separated by a plurality of radially extending lobes spaced about a periphery of the core exit aperture, the chutes and the lobes configured to mix exhaust gas flow from the core flow duct with bypass gas flow in the fan flow duct, the radially extending lobes decreasing in width progressively from a first one of the plurality of lobes to a second one of the plurality of lobes on an opposite side of the core exit aperture, and wherein the plurality of exit fan chevrons and the plurality of radially extending lobes correspond in relative width so that progressively wider lobes are matched with progressively wider chevrons about the fan exit aperture and core exit aperture respectively.

2. The nozzle system of claim 1, wherein the fan flow duct is configured to convey a relatively cool bypass gas flow, the core flow duct is configured to convey a relatively hot gas flow, and the radially extending lobes are configured to mix the relatively cool bypass gas flow with the relatively hot gas flow.

3. The nozzle system of claim 1, wherein the plurality of radially extending lobes vary in profile from each other in a selected one or more of spacing, shape, exit plane shape, and radial length about the periphery of the core exit aperture.

4. The nozzle system of claim 1, wherein the fan exit chevrons are positioned such that the radially extending lobes line up in a radial direction with spaces between the fan exit chevrons.

5. The nozzle system of claim 4, wherein the fan exit chevrons vary in shape about the periphery of the fan exit aperture, selected from one or more of varying in a length, and varying in a spacing between adjacent ones of the fan exit chevrons.

6. The nozzle system of claim 4, wherein the fan exit chevrons are positioned such that a centerline of each exit chevron lines up in a radial direction with respect to one of the chutes.

7. The nozzle system of claim 1, wherein the chutes are adjacent the radially extending lobes, the plurality of chutes configured to mix the bypass gas flow in the fan flow duct with the exhaust gas flow from the core flow duct; and wherein the plurality of chutes vary in shape about the periphery of the core exit aperture, selected from one or more of varying in a length, varying in a width, and varying in a spacing of the fan exit chevrons.

8. The nozzle system of claim 1, wherein the radially extending lobes are matched with the fan exit chevrons to provide optimal sound reduction and operational efficiency.

9. The nozzle system of claim 8, wherein the radially extending lobes are matched with the fan exit chevrons selected from one or more of a shape of the radially extending lobes and a shape of the fan exit chevrons, and a number of the radially extending lobes equaling a number of the fan exit chevrons.

10. A vehicle including a turbofan engine having a long-duct, mixed-flow nozzle system, the turbofan engine comprising:
a fan;
a core having a low-pressure compressor, a high-pressure compressor, a combustion chamber, a high-pressure turbine and a low-pressure turbine connected to drive the fan;
a core housing enclosing the core and forming a core flow duct configured to direct exhaust from the core aft of the turbofan engine, the core housing having an inlet downstream of the fan, and an outlet terminating in a core nozzle having a core exit aperture;
an outer housing having an inlet enclosing the fan and forming a fan flow duct with the core housing configured to direct airflow from the fan aft of the turbofan engine, the outer housing terminating in a fan exit aperture downstream of the core exit aperture, the fan exit aperture defining a periphery and shaped to have a plurality of fan exit chevrons spaced around the periphery of the fan exit aperture; and
the core exit aperture shaped to form a plurality of chutes separated by a plurality of radially extending lobes spaced about a periphery of the core exit aperture, the chutes and the lobes configured to mix exhaust gas flow from the core flow duct with bypass gas flow in the fan flow duct, the radially extending lobes decreasing in width progressively from a first one of the plurality of lobes to a second one of the plurality of lobes on an opposite side of the core exit aperture, and wherein the plurality of exit fan chevrons and the plurality of radially extending lobes correspond in relative width so that progressively wider are lobes matched with progressively wider chevrons about the fan exit aperture and core exit aperture respectively.

11. The vehicle of claim 10, wherein the radially extending lobes vary in profile from each other in a selected one or more of spacing, shape, exit plane shape, and radial length about the periphery of the core nozzle.

12. The vehicle of claim 11, wherein the fan exit chevrons vary in shape about the periphery of the fan exit aperture, selected from one or more of varying in a length, and varying in a spacing of the fan exit chevrons.

13. The vehicle of claim 10, wherein the fan exit chevrons are spaced about the periphery of the fan exit aperture and are positioned such that the radially extending lobes line up in a radial direction with spaces between the fan exit chevrons.

14. The vehicle of claim 13, wherein radially extending lobes are matched with the fan exit chevrons to provide optimal sound reduction and operational efficiency.

15. The vehicle of claim 14, wherein the radially extending lobes are matched with the fan exit chevrons in a selected one or more of a shape of the radially extending lobes and a shape of the fan exit chevrons, and a number of the radially extending lobes equaling a number of the fan exit chevrons.

16. A method of constructing a long-duct, mixed-flow nozzle system for a turbofan engine, the method comprising:
forming an inner housing configured to enclose a core and form a core flow duct, the inner housing terminating in a core nozzle having a core exit aperture;
forming an outer housing defining a fan flow duct and terminating in a fan exit aperture at a location downstream of the core exit aperture, the fan exit aperture defining a periphery and having a plurality of chevrons spaced around the periphery of the fan exit aperture; and
forming the core exit aperture with a plurality of chutes separated by a plurality of radially extending lobes spaced about a periphery of the core exit aperture, the chutes and the lobes shaped to mix bypass gas flow from the fan flow duct with exhaust from the core exit aperture, the radially extending lobes decreasing in width progressively from a first one of the plurality of lobes to a second one of the plurality of lobes on an opposite side of the core exit aperture, and wherein the plurality of exit fan chevrons and the plurality of radially extending lobes correspond in relative width so that progressively wider lobes are matched with progressively wider chevrons about the fan exit aperture and core exit aperture respectively.

17. The method of claim 16, wherein providing the core nozzle with a plurality of radially extending lobes includes providing a plurality of radially extending lobes spaced about the periphery of the core exit aperture that vary in profile from each other in a selected one or more of a spacing between the lobes, a shape of the lobes, an exit plane shape of the lobes, and a radial length of the lobes.

18. The method of claim 16, wherein forming the outer housing includes one or both of varying a shape of the fan exit chevrons about the periphery of the fan exit aperture and positioning the radially extending lobes to line up in a radial direction with spaces between the fan exit chevrons.

19. The method of claim 18, wherein varying the shape of the fan exit chevrons is selected from one or more of varying a length of the fan exit chevrons, and varying a spacing of the fan exit chevrons.

20. The method of claim 16, further comprising matching the radially extending lobes with the fan exit chevrons to provide optimal sound reduction and operational efficiency.

21. The method of claim 20, wherein matching the radially extending lobes with the fan exit chevrons includes selecting one or more of a shape of the radially extending lobes and a shape of the fan exit chevrons, and a number of the radially extending lobes equaling a number of the fan exit chevrons.

* * * * *